(12) United States Patent
Mohamed et al.

(10) Patent No.: US 8,751,555 B2
(45) Date of Patent: Jun. 10, 2014

(54) ROUNDING UNIT FOR DECIMAL FLOATING-POINT DIVISION

(75) Inventors: Amira Mohamed, Cairo (EG); Hossam Ali Hassan Fahmy, Cairo (EG); Ramy Raafat, Cairo (EG); Yasmeen Farouk, Cairo (EG); Mostafa Elkhouly, Cairo (EG); Rodina Samy, Cairo (EG); Tarek Eldeeb, Cairo (EG)

(73) Assignee: SilMinds, LLC, Egypt, Cairo (EG)

( * ) Notice: Subject to any disclaimer, the term of this patent is extended or adjusted under 35 U.S.C. 154(b) by 386 days.

(21) Appl. No.: 13/177,484

(22) Filed: Jul. 6, 2011

(65) Prior Publication Data

US 2012/0011185 A1    Jan. 12, 2012

Related U.S. Application Data

(60) Provisional application No. 61/361,548, filed on Jul. 6, 2010.

(51) Int. Cl.
  *G06F 7/38*    (2006.01)
(52) U.S. Cl.
  USPC ............................ 708/497; 708/200; 708/495

(58) Field of Classification Search
  None
  See application file for complete search history.

(56) References Cited

U.S. PATENT DOCUMENTS

| | | | | |
|---|---|---|---|---|
| 5,563,818 A | * | 10/1996 | Agarwal et al. | 708/400 |
| 5,671,170 A | * | 9/1997 | Markstein et al. | 708/500 |
| 6,427,160 B1 | * | 7/2002 | Parks et al. | 708/530 |
| 2007/0162535 A1 | * | 7/2007 | Wait | 708/497 |
| 2008/0288571 A1 | * | 11/2008 | Kamoshida | 708/500 |

* cited by examiner

*Primary Examiner* — Michael D Yaary
(74) *Attorney, Agent, or Firm* — Osha Liang LLP

(57) ABSTRACT

A method for performing a decimal floating-point division, including: receiving, by a decimal floating-point divider, a decimal floating-point dividend and a decimal floating-point divisor; obtaining, by the decimal floating-point divider, a preliminary quotient having a first precision level, where the preliminary quotient is calculated from the decimal floating-point dividend and the decimal-floating point divisor; receiving, by the decimal floating-point divider, a rounding mode; selecting a rounding action based on the preliminary quotient and the rounding mode; and obtaining a rounded quotient having a second precision level by rounding the preliminary quotient according to the rounding action, where the first precision level is at least one digit greater than the second precision level.

22 Claims, 11 Drawing Sheets

| Remainder | LSB | RNE (+/-) | RNT (+/-) | RNA (+/-) | RPI (+/-) | RMI (+/-) | RTZ (+/-) | RAZ (+/-) |
|---|---|---|---|---|---|---|---|---|
| 0 | X | $Q_T$ | $Q_T$ | $Q_T$ | $Q_T$ | $Q_T$ | $Q_T$ | $Q_T$ |
| > 0, < 0.5B | X | $Q_T$ | $Q_T$ | $Q_T$ | $Q_T+/Q_T$ | $Q_T/Q_T+$ | $Q_T$ | $Q_T+$ |
| 0.5B | 0 | $Q_T$ | $Q_T+$ | $Q_T+$ | $Q_T+/Q_T$ | $Q_T/Q_T+$ | $Q_T$ | $Q_T+$ |
| 0.5B | 1 | $Q_T+$ | $Q_T+$ | $Q_T+$ | $Q_T+/Q_T$ | $Q_T/Q_T+$ | $Q_T$ | $Q_T+$ |
| > 0.5B, < B | X | $Q_T+$ | $Q_T+$ | $Q_T+$ | $Q_T+/Q_T$ | $Q_T/Q_T+$ | $Q_T$ | $Q_T+$ |
| B | X | $Q_T+$ | $Q_T+$ | $Q_T+$ | $Q_T+$ | $Q_T+$ | $Q_T+$ | $Q_T+$ |
| > B, < 1.5B | X | $Q_T+$ | $Q_T+$ | $Q_T++$ | $Q_T++/Q_T+$ | $Q_T+/Q_T++$ | $Q_T+$ | $Q_T++$ |
| 1.5B | 0 | $Q_T+$ | $Q_T++$ | $Q_T++$ | $Q_T++/Q_T+$ | $Q_T+/Q_T++$ | $Q_T+$ | $Q_T++$ |
| 1.5B | 1 | $Q_T++$ | $Q_T++$ | $Q_T++$ | $Q_T++/Q_T+$ | $Q_T+/Q_T++$ | $Q_T+$ | $Q_T++$ |
| > 1.5B, < 2B | X | $Q_T++$ | $Q_T++$ | $Q_T++$ | $Q_T++/Q_T+$ | $Q_T+/Q_T++$ | $Q_T+$ | $Q_T++$ |
| 2B | X | $Q_T++$ | $Q_T++$ | $Q_T++$ | $Q_T++$ | $Q_T++$ | $Q_T++$ | $Q_T++$ |
| > 2B, < 2.5B | X | $Q_T++$ | $Q_T++$ | $Q_T++$ | $Q_T+++/Q_T++$ | $Q_T++/Q_T+++$ | $Q_T++$ | $Q_T+++$ |

FIG. 4

| LSB | GD | Remainder | RNE (+/-) | RNT (+/-) | RNA (+/-) | RPI (+/-) | RMI (+/-) | RTZ (+/-) | RAZ (+/-) |
|---|---|---|---|---|---|---|---|---|---|
| X | 0 | 0 | | $Q_{ST}$ | | | $Q_{ST}$ | | |
| X | 0 | >0 | | $Q_{ST}$ | | $Q_{ST}+/Q_{ST}$ | $Q_{ST}/Q_{ST}+$ | $Q_{ST}$ | $Q_{ST}+$ |
| X | 1-3 | X | | $Q_{ST}$ | | $Q_{ST}+/Q_{ST}$ | $Q_{ST}/Q_{ST}+$ | $Q_{ST}$ | $Q_{ST}+$ |
| 1 | 4 | X | $Q_{ST}*$ | $Q_{ST}$ | $Q_{ST}*$ | $Q_{ST}+/Q_{ST}$ | $Q_{ST}/Q_{ST}+$ | $Q_{ST}$ | $Q_{ST}+$ |
| 0 | 4 | X | | $Q_{ST}*$ | $Q_{ST}*$ | $Q_{ST}+/Q_{ST}$ | $Q_{ST}/Q_{ST}+$ | $Q_{ST}$ | $Q_{ST}+$ |
| 1 | 5 | 0 | $Q_{ST}+$ | $Q_{ST}$ | $Q_{ST}+$ | $Q_{ST}+/Q_{ST}$ | $Q_{ST}/Q_{ST}+$ | $Q_{ST}$ | $Q_{ST}+$ |
| 1 | 5 | >0 | | $Q_{ST}+$ | $Q_{ST}+$ | $Q_{ST}+/Q_{ST}$ | $Q_{ST}/Q_{ST}+$ | $Q_{ST}$ | $Q_{ST}+$ |
| 0 | 5 | 0 | $Q_{ST}$ | $Q_{ST}$ | $Q_{ST}+$ | $Q_{ST}+/Q_{ST}$ | $Q_{ST}/Q_{ST}+$ | $Q_{ST}$ | $Q_{ST}+$ |
| 0 | 5 | >0 | | $Q_{ST}+$ | $Q_{ST}+$ | $Q_{ST}+/Q_{ST}$ | $Q_{ST}/Q_{ST}+$ | $Q_{ST}$ | $Q_{ST}+$ |
| X | 6-8 | X | | $Q_{ST}+$ | | $Q_{ST}+/Q_{ST}$ | $Q_{ST}/Q_{ST}+$ | $Q_{ST}$ | $Q_{ST}+$ |
| X | 9 | X | | $Q_{ST}+*$ | | $Q_{ST}+*/Q_{ST}*$ | $Q_{ST}*/Q_{ST}+*$ | $Q_{ST}*$ | $Q_{ST}+*$ |

FIG. 5

| | LSB | Remainder | RNE (+/-) | RNT (+/-) | RNA (+/-) | RPI (+/-) | RMI (+/-) | RTZ (+/-) | RAZ (+/-) |
|---|---|---|---|---|---|---|---|---|---|
| Intermediate Rounded Quotient ($Q_{IR}$) | 1 | X | $Q_{ST}*$ | $Q_{ST}$ | $Q_{ST}*$ | $Q_{ST}+/Q_{ST}$ | $Q_{ST}/Q_{ST}+$ | $Q_{ST}$ | $Q_{ST}+$ |
| | 0 | X | | $Q_{ST}*$ | | | | | |
| | LSB | Rounded Remainder | RNE (+/-) | RNT (+/-) | RNA (+/-) | RPI (+/-) | RMI (+/-) | RTZ (+/-) | RAZ (+/-) |
| Post Correction Adjustement | 1 | 0 | $Q_{ST}+$ | | $Q_{ST}+$ | $Q_{ST}+/Q_{ST}$ | $Q_{ST}/Q_{ST}+$ | $Q_{ST}$ | $Q_{ST}+$ |
| | 0 | 0 | $Q_{ST}$ | $Q_{ST}$ | $Q_{ST}$ | | | | |
| | X | >0 | $Q_{ST}+$ | | | | | | |
| | X | <0 | $Q_{ST}$ | | | | | | |

FIG. 6

| | | Remainder | RNE (+/-) | RNT (+/-) | RNA (+/-) | RPI (+/-) | RMI (+/-) | RTZ (+/-) | RAZ (+/-) |
|---|---|---|---|---|---|---|---|---|---|
| Intermediate Rounded Quotient ($Q_{IR}$) | | X | | $Q_{ST}+$ | | $Q_{ST}+*/Q_{ST}*$ | $Q_{ST}*/Q_{ST}+*$ | $Q_{ST}*$ | $Q_{ST}+*$ |
| | | Rounded Remainder | RNE (+/-) | RNT (+/-) | RNA (+/-) | RPI | RMI (+/-) | RTZ (+/-) | RAZ (+/-) |
| Post Correction Adjustement | | 0 | | $Q_{ST}+$ | | | $Q_{ST}+$ | | $Q_{ST}+$ |
| | > 0 | | | | | $Q_{ST}++/Q_{ST}+$ | $Q_{ST}+/Q_{ST}++$ | $Q_{ST}+$ | $Q_{ST}++$ |
| | < 0 | | | | | $Q_{ST}+/Q_{ST}$ | $Q_{ST}/Q_{ST}+$ | $Q_{ST}$ | $Q_{ST}+$ |

FIG. 7

Inputs:
A = 8080699100134968   Exponent: 58   Sign: −
B = 9108091862190000   Exponent: −316   Sign: +
Rounding Mode: RNE

Reciprocal of Divisor:
X = 1/B = 1097924807007331.24

Preliminary Quotient Calculation:
Q' = X × A = 8871999999999999.87   Exponent: 358
Exponent range: $q_{min}$ = −398 ≤ 358 < 369 = $q_{max}$
⇒ exponent in normal range
Significand not shifted

Remainder Calculation:
$Q_T$ = 8871999999999999
A' = $Q_T$ × B = 8080699100134967089190813781 0000
R = A − A' = 9108091862190000 = B

Intermediate Rounded Quotient:
Table 1 lookup with R = B, LSB = 1, RNE
$Q_{IR}$ = $Q_T$+ = 8872000000000000   Exponent: 358   Sign: Pos.

Post-Correction:
No post-correction required

Exactness Check:
$R_R$ = A − ($Q_{IR}$ × B) = 0
Inexact Flag = FALSE

FIG. 8

Inputs:
A = 8080699100134968  Exponent: -314  Sign: Neg.
B = 9108091862190000  Exponent: 81  Sign: Neg.
Rounding Mode: RNE

Reciprocal of Divisor:
X = 1/B = 1097924807007331.24  Exponent: -411

Preliminary Quotient Calculation:
Q' = X × A = 8871999999999999.87
Exponent range: -411 < -398 = qmin
⇒ exponent is not in normal range
Shift significand -398 – (-411) = 13 spaces to right
$Q_S$ = 0000000000000887.19

Remainder Calculation:
$Q_{ST}$ = 0000000000000887
A' = $Q_{ST}$ × B = 8078877481762530000000000000000
R = A - A' = 1821618372438000000000000000000 > 0 (positive)

Intermediate Rounded Quotient:
Table 2 lookup with R > 0, LSB = 1, GD = 1, RNE
$Q_{IR}$ = $Q_{ST}$ = 0000000000000887  Exponent: -398  Sign: Pos.

Post-Correction:
No post-correction required

Exactness Check:
$R_R$ = A – ($Q_{AIR}$ × B) = 1821618372438000000000000000000 ≠ 0
Inexact Flag = TRUE

FIG. 9

Inputs:
A = 1565793280000000   Exponent: -86   Sign: Pos.
B = 1024000000000000   Exponent: 307   Sign: Neg.
Rounding Mode: RNE

Reciprocal of Divisor:
X = 1/B = 9765624999999999.94

Preliminary Quotient Calculation:
Q' = X × A = 15290949999999999   Exponent: -408
Exponent range: -408 < -398 = qmin
⇒ exponent is not in normal range
Shift significand -398 − (-408) = 10 spaces to right
Q' = 0000000000152909.49

Remainder Calculation:
$Q_T$ = 0000000000152909
A' = $Q_T$ × B = 1565788160000000000
R = A − A' = 14092144640000000000000 > 0 (positive)

Intermediate Rounded Quotient:
Table 2 lookup with R > 0, LSB = 1, GD = 4, RNE
$Q_{IR}$ = $Q_{ST}$ = 0000000000152909   Exponent: -398

Post-correction:
A' = ($Q_{ST}$ + 0.5 ULP) × B = 1529095000000000 ×
1024000000000000 = 1565793280000000000000000000000
$R_R$ = A − A' = 0
Table 3 lookup with LSB = 1, $R_R$ = 0, RNE
$Q_R$ = $Q_T$+ = 0000000000152910   Exponent: -398
Inexact Flag = TRUE

ROUNDING UNIT FOR DECIMAL FLOATING-POINT DIVISION

CROSS-REFERENCE TO RELATED APPLICATIONS

This application is a non-provisional patent application of U.S. Provisional Patent Application Ser. No. 61/361,548, filed on Jul. 6, 2010, and entitled: "Rounding Unit for Decimal Floating-point Division." Accordingly, this non-provisional patent application claims priority to U.S. Provisional Patent Application Ser. No. 61/361,548 under 35 U.S.C. §119 (e). U.S. Provisional Patent Application Ser. No. 61/361,548 is hereby incorporated in its entirety.

BACKGROUND

Many financial and commercial data repositories and applications need to store and compute numerical data in decimal format. However, typical microprocessors do not provide native hardware support for decimal floating-point arithmetic. As a result, decimal numbers are usually converted into binary format for processing by binary floating-point arithmetic units and are converted back into decimal format after the arithmetic computations are completed. Since decimal numbers cannot be represented exactly in binary format, the conversions between the two formats may lead to precision errors. Although an error from a single conversion is generally small, many calculations and systems performing these calculations may require several back-in-forth conversions between the two formats, leading to larger and more significant errors.

In general, especially for commercial and financial applications, errors introduced by converting between decimal and binary numbers, even for a single conversion step, are unacceptable and may violate accuracy standards. Many current solutions use software-based computations that can eliminate precision errors. However, a software-based floating-point unit is several orders of magnitude slower than a hardware-based floating-point unit. This reduced performance is often unacceptable in settings that require high calculation throughput and/or low latency per calculation. In order to achieve accurate and fast decimal floating-point calculations, a hardware-based decimal floating-point unit is needed.

SUMMARY OF INVENTION

In general, in one aspect, the invention relates to a method for performing a decimal floating-point division operation using a decimal floating-point divider. The method comprises: receiving, by the decimal floating-point divider, a decimal floating-point dividend and a decimal floating-point divisor; obtaining, by the decimal floating-point divider, a preliminary quotient having a first precision level, wherein the preliminary quotient is calculated from the decimal floating-point dividend and the decimal-floating point divisor; receiving, by the decimal floating-point divider, a rounding mode; selecting a rounding action based on the preliminary quotient and the rounding mode; and obtaining a rounded quotient having a second precision level by rounding the preliminary quotient according to the rounding action, wherein the first precision level is at least one digit greater than the second precision level.

In general, in one aspect, the invention relates to a decimal floating-point divider. The decimal floating-point divider comprises: a rounding unit executing on a processor and comprising functionality to: receive a decimal floating-point dividend, a decimal floating-point divisor, and a rounding mode; receive a preliminary quotient having a first precision level, wherein the preliminary quotient is calculated from the decimal floating-point dividend and the decimal-floating point divisor; select a rounding action based on the preliminary quotient and the rounding mode; and obtain a rounded quotient having a second precision level by rounding the preliminary quotient according to the rounding action, wherein the first precision level is at least one digit greater than the second precision level.

Other aspects of the invention will be apparent from the following description and the appended claims.

BRIEF DESCRIPTION OF DRAWINGS

FIGS. 4, 5, 6, and 7 show tables in accordance with one or more embodiments of the invention.

FIGS. 8, 9, and 10 show examples in accordance with one or more embodiments of the invention.

DETAILED DESCRIPTION

Figure 1:
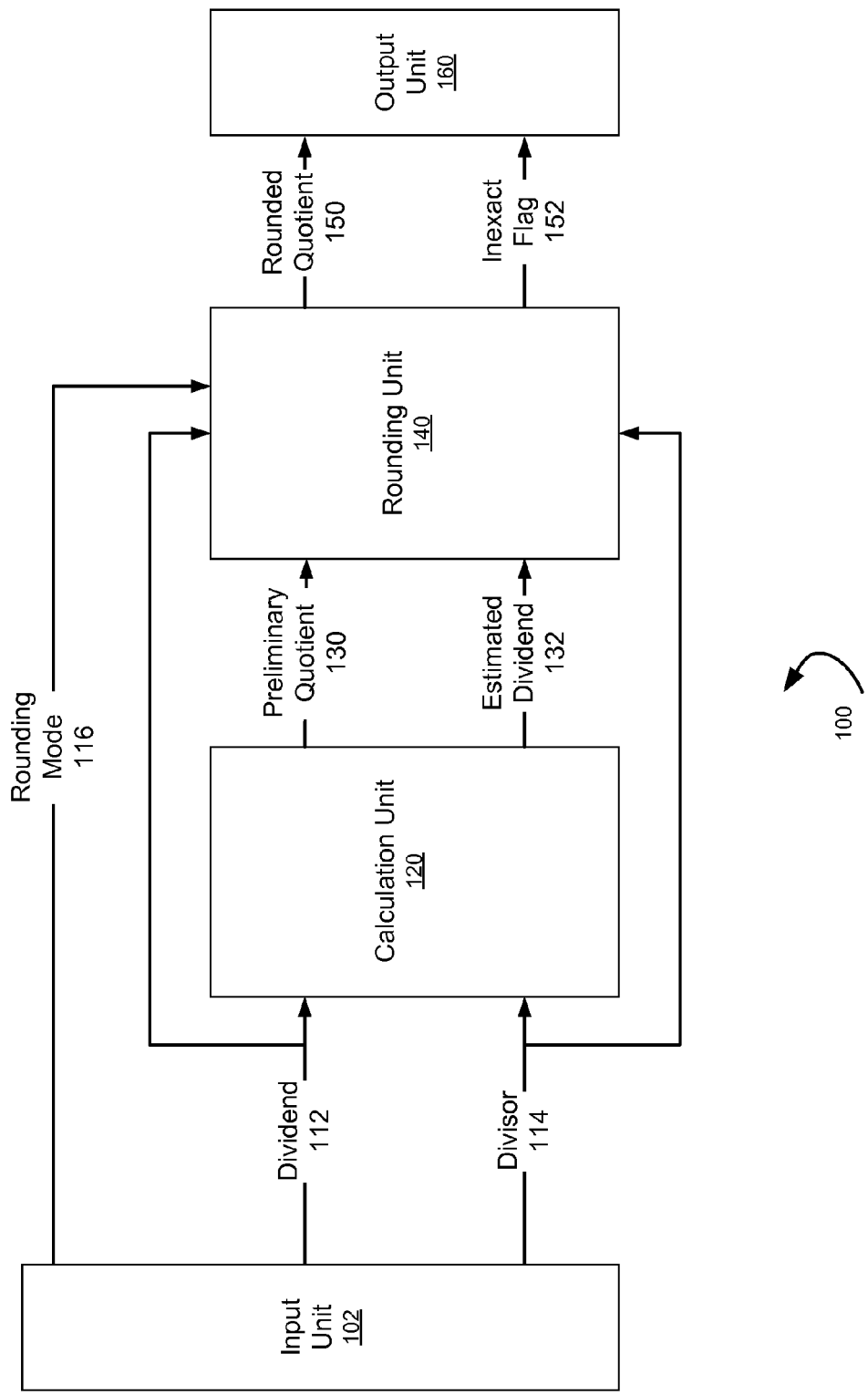
FIG. 1 shows a system having multiple components in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for performing a floating-point division operation and properly rounding the result based on a rounding mode selected by a user from a list of acceptable rounding modes. A decimal floating-point divider receives as input a decimal floating-point dividend (e.g., a decimal representation of a decimal number stored in a register in floating-point format), a decimal floating-point divisor, and a rounding mode (e.g., round toward zero (RTZ)) and outputs a rounded quotient and an inexact flag according to the IEEE 754-2008 standard. The floating-point divider includes a rounding unit that uses a novel rounding algorithm for efficiently rounding the result to the correct value for all valid numerical inputs and rounding modes. The floating-point divider also handles non-numerical values and special values including infinity (i.e., Inf) and not-a-number (i.e., NaN). The non-numerical values and special values may be handled in preprocessing and/or post-processing units, parallel to the data path. Further, the floating-point divider handles divide by zero, underflow, overflow, invalid, and inexact flags. The decimal floating-point divider may be part of a microprocessor or any other hardware system required to perform floating-point division operations.

FIG. 1 shows a system (100) in accordance with one or more embodiments of the invention. As shown in FIG. 1, the system (100) has an input unit (102) that provides a dividend (112) and a divisor (114) to a calculation unit (120), in accordance with one or more embodiments of the invention. The calculation unit produces a preliminary quotient (130) and an estimated dividend (132) that are inputted into a rounding unit (140) along with the dividend (112), the divisor (114), and a rounding mode (116), also provided by the input unit (102), in accordance with one or more embodiments of the invention. In one or more embodiments of the invention, the rounding unit (140) outputs a rounded quotient (150) and an inexact flag (152) into an output unit (160).

In one or more embodiments of the invention, the input unit (102) includes any combination of hardware (e.g., logic gates, multiplexers, flip flops, registers, lookup tables, transistors, processors, integrated circuits, RAM, etc.) and software components (e.g., an instruction set executing on a hardware component). The input unit (102) outputs the dividend (112) and the divisor (114) and allows the calculation unit (120) to sample and/or latch the dividend (112) and the divisor (114), in accordance with one or more embodiments of the invention. The input unit (102) may include registers or queues used to temporarily store the values of the dividend (112) and the divisor (114) and may be in electronic communication (e.g., connected with a wire on a microchip) with the calculation unit (120). The input unit may be any module on a microchip on which the floating-point divider is implemented or may exist on a different microchip or other source and be connected (e.g., via a pad on the microchip implementing the floating-point divider) to the calculation unit (120) and the rounding unit (140). Any of the outputs of the input unit (102) may be outputted from another calculation unit (not shown) or rounding unit (not shown). In one or more embodiments of the invention, the dividend (112), the divisor (114), and the rounding mode (116) arrive from different sources (i.e., different input units).

In one or more embodiments of the invention, the dividend (112) is a decimal number stored in floating-point format that is to be divided by the divisor (114), which is also a decimal number stored in floating-point format. Floating-point number representation, especially for the decimal floating-point format, is similar to standard scientific number representation. Generally speaking, a floating-point number includes a sign bit (e.g., positive or negative sign represented by a 0 and 1, respectively), a significant that contains the significant digits of the floating-point number and has a precision level equaling the number of significand digits, and an exponent that represents a multiplication of the significand by a base to the power of the exponent, where the base is 10 for decimal arithmetic and 2 for binary arithmetic. For example, consider the number $-123 \times 10^2$. The sign is of this number is negative, the significand is 123 and has a precision level of three, the base is 10, and the exponent is 2. In one or more embodiments of the invention, the dividend (112), the divisor (114), or any other value used by the system (100) may first be aligned (i.e., the significand of the value is shifted to the left by the number of leading zeros in the significand, and the exponent is adjusted appropriately). In one or more embodiments of the invention, the rounding unit (140) receives aligned values as input whereas the calculation unit (120) receives non-aligned values. As in scientific number representation, floating-point computations may be performed independently on the sign, significand, and exponent, except in special cases (e.g., when the exponent underflows and the significand requires shifting). When referring to the dividend (112), the divisor (114), or any other floating-point numbers used in this specification, the reference may be to either any one part of the floating-point number (i.e., either the significand, the sign, or the exponent of the floating-point number), to all three parts of the floating-point number, or to any combination of two of these parts. As there may be multiple representations of a unique floating-point number, any reference to a floating-point number may be interpreted as a reference to all representations of that floating-point number or to any one representation (e.g., aligned, normalized, trailing zeros removed, leading zeros removed, right shifted, left shifted, and others representations) of that floating point number. Unless otherwise noted, any numeric examples contained in the rest of this specification are assumed to be on the significand of a floating-point number. In general, decimal numbers may be represented in decimal format in hardware or software modules in any form of binary-coded decimal (BCD) or densely-packed decimal (DPD) encoding or binary integer decimal (BID) encoding. For example, a single decimal digit may be represented by a single nibble (i.e., four bits) of binary bits. Specifically, the decimal number 2 may be represented by the binary nibble 0010, whereas the decimal number 9 may be represented by the binary nibble 1001. Those skilled in the art, having the benefit of this detailed description will appreciate that many other and more compact forms of representing decimal numbers in binary format exist and may be used in any of the modules of the system (100).

In one or more embodiments of the invention, the floating-point numbers used by system (100) conform to a particular rule standard set by a standards authority. In one or more embodiments of the invention, the rule standard that is used for representing floating point numbers is the IEEE 754-2008 standard, which defines a 64 bit decimal floating-point standard (i.e., decimal 64, a decimal interchange format encoded in 64 bit width) and a 128 bit decimal floating-point standard (i.e., decimal 128, a decimal interchange format encoded in 128 bit width). The 64 bit standard contains a single sign bit, 16 significand digits, and an exponent between −398 and 369 when the decimal is normalized to be after the last digit in the significand. The last significand digit is referred to as a unit in the last place (ULP), while the following digit, which is often stored and implemented in hardware operations following the IEEE 754-2008 standard, is referred to as the guard digit (GD). For example, if a hardware unit for decimal 64 internally stores the number 1234567890123456.7, the digit in the ULP is 6 and the guard digit is 7. In one or more embodiments of the invention, an internal representation of a significand contains a number of digits as defined by a rule standard (e.g., 16 in decimal 64) and any number of other less significant digits (e.g., a guard digit and other less significant digits). When a significand is shifted to the left, some of the less significant digits may become part of the significand digits in the internal representation of the significand. When a significand is shifted to the right, some of the significand digits may become part of the less significant digits in the internal representation of the significand. Those skilled in the art will appreciate that the position of the decimal point is arbitrary and that there exist several ways of representing the same number in floating-point format. For the sake of consistency and simplicity, the examples in the rest of this specification will cover a decimal 64 implementation with the decimal assumed to be behind the last digit of the significand and before the guard digit. Those skilled in the art will appreciate that the same system blocks, methods, examples, and calculations used for decimal 64 may be readily extended to decimal 128 or any other similar standard by those skilled in the art. For some calculations used in various components of system (100), the LSB (least-significant bit) of a number may be useful. The LSB is determined from the digit in the ULP and is zero when this digit is even and one when this digit is odd. Following the previous example, the digit in the ULP is 6, which is even, so the LSB=0.

In one or more embodiments of the invention, the input unit (102) provides a rounding mode (116). Generally speaking, a rounding mode defines how a floating-point number is to be rounded from a higher precision level to a lower precision level. The IEEE 754-2008 standard defines five rounding modes. The supported rounding modes include round to nearest ties to even (RNE), round to nearest ties away from zero (RNA), round toward zero (RTZ), round toward positive infinity (RPI), and round toward minus infinity (RMI). Many software libraries also support round to nearest ties towards zero (RNT) and round away from zero (RAZ). For example, if the number 40.5 is to be rounded to a precision level of two, the number becomes 40 using RNE, 41 using RNA, 40 using RNT, 41 using RAZ, 40 using RTZ, 41 using RPI, and 40 using RMI. In another example, the number −41.5 rounded to a precision level of two becomes −42 using RNE, −42 using RNA, −41 using RNT, −42 using RAZ, −41 using RTZ, −41 using RPI, and −42 using RMI. The system (100) may support any of the rounding modes described above and can be readily extended to additional rounding modes.

In one or more embodiments of the invention, the calculation unit (120) includes any combination of hardware (e.g., logic gates, multiplexers, flip flops, registers, lookup tables, transistors, processors, integrated circuits, RAM, etc.) and software components (e.g., an instruction set executing on a hardware component). The calculation unit (120) takes as input the dividend (112) and the divisor (114) and calculates a preliminary quotient (130) and an estimated dividend (132), in accordance to one or more embodiments of the invention. In one or more embodiments of the invention, the calculation unit (120) first computes the reciprocal of the divisor and then multiples the reciprocal of the divisor by the dividend (112) to arrive at the preliminary quotient (130). In one or more embodiments of the invention, a rough estimate of the reciprocal is calculated using one of many well known means (e.g., piecewise linear approximation, lookup tables, and other means for approximating a reciprocal). Subsequently, the calculation unit (120) may include hardware supporting Newton-Raphson iterations, which can be performed on the estimated reciprocal to increase the precision level of the estimated reciprocal. Those skilled in the art will appreciate that the Newton-Raphson method may double the precision level of a number with each iteration. For example, if the reciprocal estimate has initially a precision level of two, then after the first iteration it may have a precision level of four, and after another iteration it may have a precision level of eight. For example, the reciprocal estimate of 9 may be 0.1. After the first iteration, the new estimate may be 0.11, while after the next iteration the new estimate may be 0.1111. Those skilled in the art will appreciate that in order to reach a required precision level for the final result, a certain number of Newton-Raphson iterations need to be performed. The number of Newton-Raphson iterations that are needed may be reduced by obtaining a more precise estimated reciprocal in the first place. Likewise, the precision level of the estimated reciprocal may be reduced and more Newton-Raphson iterations may be performed to compensate and still obtain a required precision level for the final result.

In one or more embodiments of the invention, the preliminary quotient (130) is a quotient of the dividend (112) divided by the divisor (114) that has a precision level that is greater than or equal to a precision level required by a rule standard (e.g., one or more extra digits). For example, if the significand of the preliminary quotient (130) typically has p digits, the preliminary quotient (130) may have p, p+1, p+2, or more digits. In one or more embodiments of the invention, the estimated dividend (132) is a product of the preliminary quotient (130) truncated to a rule standard and the divisor (114) and is generally very close to the value of the dividend (112).

In one or more embodiments of the invention, the rounding unit (140) includes any combination of hardware (e.g., logic gates, multiplexers, flip flops, registers, lookup tables, transistors, processors, integrated circuits, RAM, etc.) and software components (e.g., an instruction set executing on a hardware component). The rounding unit (140) may include combinational, sequential, and pipelined modules. The rounding unit (140) takes as input the dividend (112), the divisor (114), the rounding mode (116), the preliminary quotient (130), and the estimated dividend (132) and calculates a rounded quotient (150) and an inexact flag (152), in accordance with one or more embodiments of the invention. The rounded quotient (150) may be a rounded version of the preliminary quotient (130) according to a rule standard and based on the rounding mode (116). In general, the rounded quotient (150) has a lower precision level than the preliminary quotient (130). The inexact flag (152) may be a one bit output (e.g., 1 or 0, TRUE or FALSE, etc.) that indicates whether the resulting rounded quotient (150) is inexact as defined by a rule standard (e.g., IEEE 754-2008). This may happen, for example, when the division operation requires a significand of the result to be shifted to the right, thereby losing precision and obtaining an inexact result. In one or more embodiments of the invention, the rounding unit (150) performs a rounding action. The rounding action may involve truncating the preliminary quotient to the required precision level and then adding several ULPs (e.g., generally between zero and three ULPs) to the truncated quotient. In one or more embodiments of the invention, the rounding action includes shifting the significand to the right when the exponent of the result is too small according to a rule standard. In one or more embodiments of the invention, the rounding action includes a post-correction adjustment step where an intermediate rounded quotient is checked and adjusted before being outputted as the rounded quotient (150)). After the rounded quotient (150) and the inexact flag (152) are calculated, the rounded quotient (150) and the inexact flag (152) are sent to the output unit (160), which may include any combination of hardware or software that is used to store, forward, and/or use the results from the rounding unit (140). Those skilled in the art, having the benefit of this detailed description, will appreciate that the rounding unit (140) may receive other signals as input, including shift amounts, indications that a floating-point number is normal or subnormal, and other signals. Further, those skilled in the art will appreciate that the rounding unit (140) may output other flags, such as a flag indicating underflow of the exponent of the rounded quotient (150). In one or more embodiments of the invention, the rounding unit (140) receives as input only the significands and signs of some or all floating-point number inputs (e.g., dividend (112)), and the calculation of the exponents occurs elsewhere (e.g., in a separate exponent calculation unit (not shown)). The rounding unit (140) is further described below.

Figure 2:
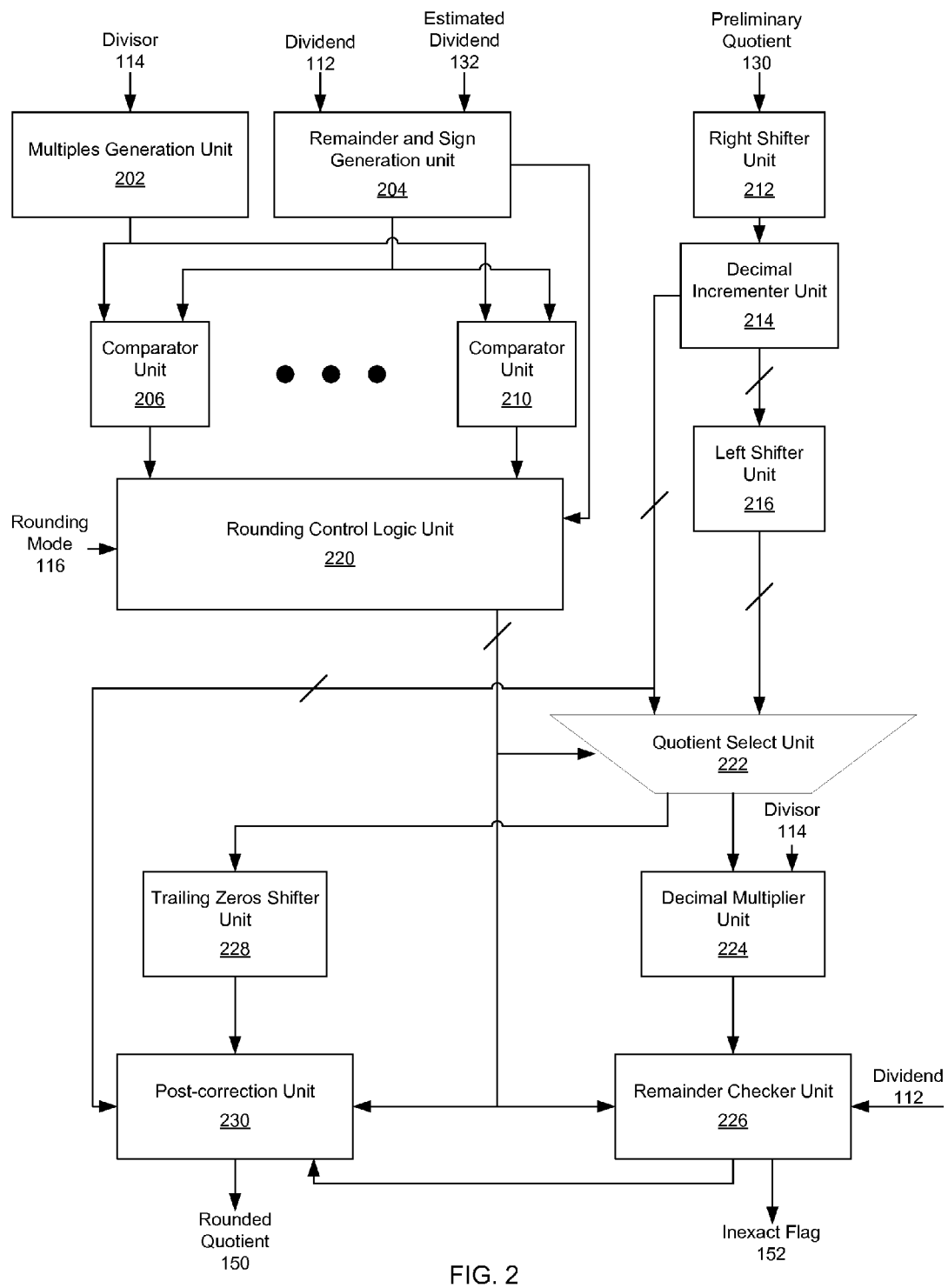
FIG. 2 shows one or more components of the system in FIG. 1, in accordance with one or more embodiments of the invention.

FIG. 2. shows the individual components of the rounding unit (140) shown in FIG. 1 in accordance with one or more embodiments of the invention. Those skilled in the art, having the benefit of this detailed description, will appreciate the organization of the components in FIG. 2 may differ among embodiments of the invention. For example, one or more of the existing components may be optionally excluded, duplicated, repeated, or substituted. Further, in one or more embodiments of the invention, any hardware or software components that are known in the art may be added. Further still, those skilled in the art, having the benefit of this detailed description, will appreciate that although the components in FIG. 2 are organized to enable a certain flow of data, some of the components in FIG. 2. may process data in parallel as other components in FIG. 2. Further still, those skilled in the art will appreciate that only major signals are shown going into and out of each block, and that there may be additional signals inputted and outputted from each block, and that each specific signal may be one bit wide or multiple bits wide.

Continuing with FIG. 2, the rounding unit (140) includes a multiples generation unit (202), a remainder and sign generation unit (204), several comparator units (206, 210), a right shifter unit (212), a decimal incrementer unit (214), a left shifter unit (216), a rounding control logic unit (220), a quotient select unit (222), a decimal multiplier unit (224), a remained checker unit (226), a trailing zeros shifter unit (228), and a post-correction unit (230), in accordance with one or more embodiments of the invention.

In one or more embodiments of the invention, the multiples generation unit (202) includes any combination of hardware (e.g., logic gates, multiplexers, flip flops, registers, lookup tables, transistors, processors, integrated circuits, RAM, etc.) and software components (e.g., an instruction set executing on a hardware component). The multiples generation (202) takes the divisor (114) and generates several multiples of one half of the divisor, in accordance to one or more embodiments of the invention. For example, if the divisor (114) is B=4, the multiples generation unit (202) may generate the following sequence of numbers ½ B×0=0, ½ B×1=2, ½ B×2=4, ½ B×3=6, ½ B×4=8, and so on. Each of these numbers may be referred to as a remainder threshold. The number of remainder thresholds that the multiples generation unit (202) generates may depend on the precision of the preliminary quotient (130) and estimated dividend (132). Generally speaking, less remainder thresholds are required the higher the precision levels are of the preliminary quotient (130) and estimated dividend (132).

In one or more embodiments of the invention, the remainder and sign generation unit (204) includes any combination of hardware (e.g., logic gates, multiplexers, flip flops, registers, lookup tables, transistors, processors, integrated circuits, RAM, etc.) and software components (e.g., an instruction set executing on a hardware component). The remainder and sign generation unit (204) takes the dividend (112) and estimated dividend (132) and subtracts the dividend (112) from the estimated dividend (132) to generate a remainder, in accordance to one or more embodiments of the invention. For example, if the dividend (112) equals 9 and the estimated dividend (132) equals 8, the remainder and sign generation unit (204) may output 9−8=1. The remainder and sign generation unit (204) may also determine the sign of the remainder (i.e., whether the remainder is positive, zero, or negative) and may output a signal indicating the sign of the remainder to any of the other blocks in FIG. 2.

In one or more embodiments of the invention, the comparator units (206, 210) include any combination of hardware (e.g., logic gates, multiplexers, flip flops, registers, lookup tables, transistors, processors, integrated circuits, RAM, etc.) and software components (e.g., an instruction set executing on a hardware component). Each comparator unit compares one of the remainder thresholds outputted by the multiples generation unit (202) to the remainder outputted by the remainder and sign generation unit (204) and outputs a signal indicating whether the remainder is greater than, equal to, or less than the remainder threshold, in accordance with one or more embodiments of the invention. By having multiple comparator units, an individual may determine a range, referred to as a remainder range, of where the remainder lies in comparison to the divisor (114). For example, if the remainder equals 3, then following a previous example from above, a comparator (e.g., 206) that receives remainder R=3 and remainder threshold $R_{TH}$=2 will indicate that R>$R_{TH}$, whereas a comparator (e.g., 206) that receives remainder R=3 and remainder threshold $R_{TH}$=4 will indicate that R<$R_{TH}$. As a result, the rounding unit in FIG. 2 may deduce that the remainder is in between R=2 and R=4. In one or more embodiments of the invention, the remainder thresholds may be aligned prior to comparison with the remainder.

In one or more embodiments of the invention, the right shifter unit (212) includes any combination of hardware (e.g., logic gates, multiplexers, flip flops, registers, lookup tables, transistors, processors, integrated circuits, RAM, etc.) and software components (e.g., an instruction set executing on a hardware component). The right shifter unit takes the preliminary quotient (130) and shifts the internal representation of the preliminary quotient if the exponent is out of range (e.g., too small to be encoded in the bits of the exponent field according to a rule standard). For example, if the preliminary quotient (130) is $12345 \times 10^{-11}$, and the minimum allowed exponent is −10, then the significand may be shifted to the right by one digit to obtain $01234 \times 10^{-10}$, which is approximately equal to the previous unshifted value. Those skilled in the art will appreciate that the precision level of the significand may drop by an amount equal to the number of digits that the significand is shifted to the right. The right shift unit may detect the proper shift amount or may receive the shift amount as a signal from another block in FIG. 2 or as an external input to the rounding unit (140 in FIG. 1). The right shift unit may also output a signal that specifies the least significant bit (LSB) (not shown), a guard digit (not shown) of the preliminary quotient (130), and a sticky bit (not shown) that expresses the loss of precision digits due to shifting (not shown). In one or more embodiments of the invention, a sticky bit that is true (e.g., represented by a binary value of one) indicates that the shifted quotient is inexact. The sticky bit may be used by the remainder and sign generation unit (204). In one or more embodiments of the invention, the right shift unit (212) does not shift the preliminary quotient (130) at all, or equivalently the preliminary quotient (130) is shifted by zero digits, when the exponent of the preliminary quotient (130) is already in the normal range.

Continuing with FIG. 2, in one or more embodiments of the invention, the decimal incrementer unit (214) includes any combination of hardware (e.g., logic gates, multiplexers, flip flops, registers, lookup tables, transistors, processors, integrated circuits, RAM, etc.) and/or software components (e.g., an instruction set executing on a hardware component). The decimal incrementer unit takes the shifted quotient from the right shifter unit (212), truncates the shifted quotient to the number of precision digits required by a rule standard, and increments the significand of the shifted truncated quotient by an increment value, in accordance with one or more embodiments of the invention. In one or more embodiments of the invention, the increment value may be any number but is generally between zero to four ULPs. The increment value may also be 0.5 ULP and any other multiple of 0.5 ULP. In one or more embodiments of the invention, the decimal incrementer unit (214) outputs several incremented versions of the shifted truncated quotient in parallel (e.g., $Q_{ST}$, $Q_{ST}$+0.5 ULP, $Q_{ST}$+1 ULP, $Q_{ST}$+2 ULP, $Q_{ST}$+3 ULP, etc., where $Q_{ST}$ is the shifted truncated quotient). As discussed above, the right shifter unit (212) may not shift the preliminary quotient (130)

at all, in which case the decimal incrementer unit (214) may generate a truncated quotient, rather than a shifted truncated quotient, and may increment the truncated quotient in the same manner as discussed above for the shifted truncated quotient.

In one or more embodiments of the invention, the left shifter unit (216) includes any combination of hardware (e.g., logic gates, multiplexers, flip flops, registers, lookup tables, transistors, processors, integrated circuits, RAM, etc.) and software components (e.g., an instruction set executing on a hardware component). The left shifter unit (216) takes the incremented shifted truncated quotients from the decimal incrementer unit (214) and shifts them back to the original version (i.e., shifts them left with the same amount as the right shifter unit (212) shifted them right, a process referred to as alignment or normalization). Following a previous example from above, if 01234 is the significand of the shifted preliminary quotient as a result of a right shift by one place, and this significand is incremented by two ULPs (i.e., 01234+00002=01236), the left shifter unit (216) will output 12360 as the significand after alignment. One reason the significand is shifted back to the original position may be to align the significand to other values used by other blocks in FIG. 2. In one or more embodiments of the invention, aside from outputting significands that are left shifted back to their original position, the left shifter unit (216) may also output unmodified significands (i.e., not shifted back to their original position or shifted to the left by zero) as these non-aligned significands may be also be used by other blocks in FIG. 2.

In one or more embodiments of the invention, the rounding control logic unit (220) includes any combination of hardware (e.g., logic gates, multiplexers, flip flops, registers, lookup tables, transistors, processors, integrated circuits, RAM, etc.) and software components (e.g., an instruction set executing on a hardware component). The rounding control logic unit (220) takes the rounding mode (116), the results from the comparators (206, 210), the remainder sign indicator from the remainder and sign generation unit (204), and various values associated with the preliminary quotient or the shifted preliminary quotient (e.g., LSB, GD, sign, exponent value, exponent value range, and other values that are part of the quotient) and generates control signals that are used to perform one or more of the following functions: (1) select the proper incremented version of the truncated quotient, shifted truncated quotient, and/or aligned shifted truncated quotient from the left shifter unit (216) and the decimal incrementer unit (214), (2) calculate the shift amount for the significand of the preliminary quotient, (3) determine the inexact flag, (4) decide if and what post-correction adjustment is to be applied to the shifted truncated quotient, and (5) send any other control signals to any other blocks of shown in FIG. 2, in accordance with one or more embodiments of the invention. The choices selected by the rounding control logic unit (220) may be collectively referred to as a rounding action. The choice of which rounding action is to be taken may be encoded into a memory or table (e.g., a lookup table) within the rounding control logic unit (220) or external to the rounding control logic unit (220) and may depend on the aforementioned inputs to the rounding control logic unit (220), as described above. The contents and/or rules that determine the rounding action in the lookup tables are described further below in reference to FIGS. 4-7.

Continuing with FIG. 2, in one or more embodiments of the invention, the quotient select unit (222) includes any combination of hardware (e.g., logic gates, multiplexers, flip flops, registers, lookup tables, transistors, processors, integrated circuits, RAM, etc.) and software components (e.g., an instruction set executing on a hardware component). The quotient select unit (222) selects one of the non-aligned (i.e., not left shifted) quotients from the decimal incrementer unit (214) (i.e., shifted truncated preliminary quotients or truncated preliminary quotients) based on one or more control signals from the rounding control logic unit (220), in accordance with one or more embodiments of the invention. The resulting quotient may be referred to as an intermediate rounded quotient and is outputted to the trailing zeros unit (228), which is further described below. In addition, quotient select unit (222) selects one of the aligned (i.e., left shifted) quotients from the left shifter unit (216) (i.e., aligned shifted truncated preliminary quotients or aligned truncated preliminary quotients), based on one or more control signals from the rounding control logic unit (220), in accordance with one or more embodiments of the invention. The resulting quotient may be referred to as an aligned intermediate rounded quotient and is outputted to the decimal multiplier unit (224), further described below.

In one or more embodiments of the invention, the decimal multiplier unit (224) includes any combination of hardware (e.g., logic gates, multiplexers, flip flops, registers, lookup tables, transistors, processors, integrated circuits, RAM, etc.) and software components (e.g., an instruction set executing on a hardware component). The decimal multiplier unit (224) takes the aligned intermediate rounded quotient selected by the quotient select unit (222) and multiplies it by the divisor (114) to generate a rounded estimated dividend, in accordance with one or more embodiments of the invention. The rounded estimated dividend may be used for determining the post-correction adjustment and calculations of inexactness.

In one or more embodiments of the invention, the remainder checker unit (226) includes any combination of hardware (e.g., logic gates, multiplexers, flip flops, registers, lookup tables, transistors, processors, integrated circuits, RAM, etc.) and software components (e.g., an instruction set executing on a hardware component). The remainder checker unit (226) takes the rounded estimated dividend outputted by the decimal multiplier unit (224) and subtracts it from the dividend (112) to generate a rounded remainder, in accordance with one or more embodiments of the invention. The remainder checker unit (226) may also receive one or more control signals from the rounding control logic unit (220) and may determine the inexact flag (152) based on the control signal and the sign of the rounded remainder.

In one or more embodiments of the invention, the trailing zeros shifter unit (228) includes any combination of hardware (e.g., logic gates, multiplexers, flip flops, registers, lookup tables, transistors, processors, integrated circuits, RAM, etc.) and software components (e.g., an instruction set executing on a hardware component). The trailing zeros shifter unit (228) takes the intermediate rounded quotient (e.g., preselected by the quotient select unit (222)) and shifts the result to remove trailing zeros. The number of trailing zeros to be removed is determined by an external control logic signal from a control unit based on the trailing zeros count (TZC) determined by the control unit and may include none, some, or all trailing zeros in the significand of the intermediate rounded quotient. For example, if the significand is 24500 and the control logic dictates that all trailing zeros are to be removed, the result of the trailing zeros shifter (228) unit may be 00245, along with an appropriate increase of the exponent by two. Those skilled in the art will appreciate that some trailing zeros may not be removed according on a rule standard.

In one or more embodiments of the invention, the post-correction unit (230) includes any combination of hardware (e.g., logic gates, multiplexers, flip flops, registers, lookup tables, transistors, processors, integrated circuits, RAM, etc.) and software components (e.g., an instruction set executing on a hardware component). The post-correction unit (230) takes the result of the trailing zeros shifter unit (228) and the versions of the non-aligned incremented shifted truncated quotients outputted by the decimal incrementer unit (214) and selects one of these values to obtain a rounded quotient (150). This selection effectively results in a post-correction adjustment (e.g., increment a value by one ULP) to the intermediate rounded quotient (i.e., the resulting rounded quotient (150) may be different than the intermediate rounded quotient). The post-correction adjustment may also be determined by control signals received from the rounding control logic unit (220) and the rounded remainder outputted by the remainder checker unit (226).

In one or more embodiments of the invention, the post-correction unit (230) adjusts the intermediate rounded quotient selected by the quotient select unit (222) instead of selecting the proper incremented quotient (e.g., the post-correction unit includes decimal incremented and/or decrementer). In one or more embodiments of the invention, the post-correction unit (230) includes the remainder checker unit (226), the decimal multiplier unit (224), and any other hardware or software component that is required to determine whether a post-correction adjustment is necessary, to determine what post-correction adjustment is to be applied, and to apply the post-correction adjustment. In one or more embodiments of the invention, for a preliminary quotient of a precision level that is two digits greater than a required precision level, a post-correction adjustment occurs when the GD of the shifted preliminary quotient equals nine, when the GD equals four and the rounding mode is RNA, or when the GD equals four, the rounding mode is RNE, and the LSB of the shifted preliminary quotient equals one. If the precision level of the preliminary quotient is one digit greater than the required precision level or is the same as the required precision level, then a post-correction adjustment may occur for more cases than the cases stated above. Those skilled in the art, having the benefit of this detailed description, will appreciate that the post-correction unit is necessary to correct rounding errors of the rounding algorithm presented in U.S. Pat. No. 7,467,174 occurring for some specific values of dividend (112) and divisor (114).

Figure 3:
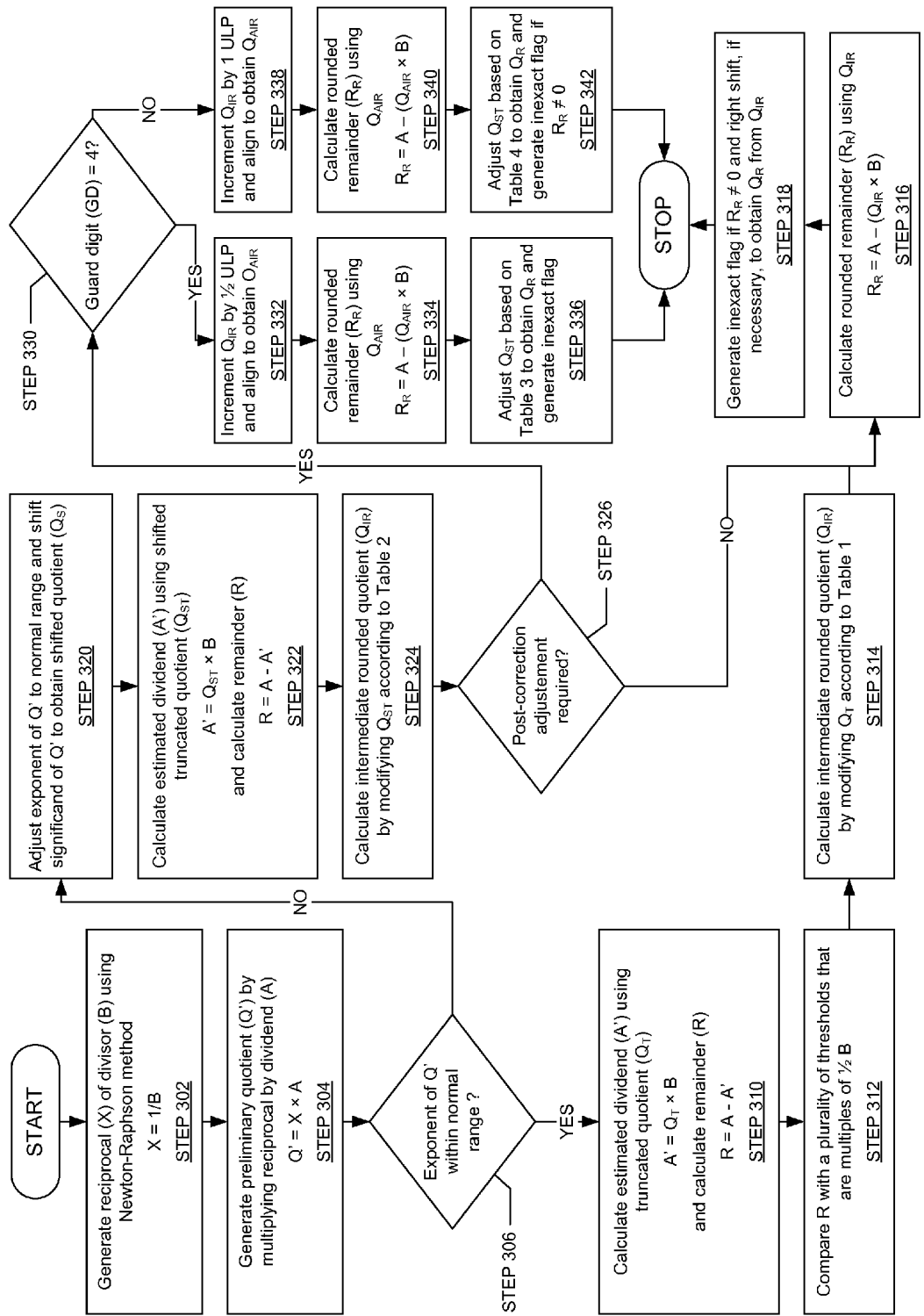
FIG. 3 shows a flowchart in accordance with one or more embodiments of the invention.

FIG. 3 shows a flowchart in accordance with one or more embodiments of the invention. The process shown in FIG. 3 may be a division operation used by a decimal floating-point divider (e.g., system (100 in FIG. 1)) to divide a floating-point dividend by a floating-point divisor and properly round the resulting quotient. Further, the process shown in FIG. 3 may be implemented using one or more components of the system (100 in FIG. 1). Those skilled in the art, having the benefit of this detailed description, will appreciate that the sequence of steps shown in FIG. 3 may differ among embodiments of the invention, that one or more of the steps shown in FIG. 3 may be repeated, omitted, or substituted, and that one or more steps shown in FIG. 3 may occur in parallel with other steps in FIG. 3.

Initially, the reciprocal (X) of divisor (B) is generated (STEP 302) by calculating $X=1/B$. In one or more embodiments of the invention, the reciprocal (X) is generated using the Newton-Raphson method. As discussed above, the Newton-Raphson iterations may be performed on a reciprocal estimate to obtain a reciprocal that has a higher precision level than the precision level required by a rule standard.

After STEP 302, the process proceeds to STEP 304. In STEP 304, the preliminary quotient (Q') is generated by multiplying the reciprocal (X) by the dividend (A). In general, the preliminary quotient has one or more extra digits of precision than required by rule standard. In STEP 306, the exponent of Q' is read to determine whether the exponent of Q' is within a normal range as defined by a rule standard (e.g., IEEE 754-2008). When it is determined that the exponent of Q' is within the normal range, the process proceeds to STEP 310. Otherwise, when it is determined that the exponent of Q' is not within the normal range, the process proceeds to STEP 320.

In STEP 310, the preliminary quotient is truncated to obtain a truncated quotient ($Q_T$). Then the estimated dividend (A') is calculated using the truncated quotient by taking the product of the truncated quotient and the divisor (i.e., $Q_T \times B$). Subsequently, the process proceeds to calculate a remainder (R) by subtracting the estimated dividend from the dividend (i.e., $R=A-A'$). The process then proceeds to STEP 312.

In STEP 312, the remainder is compared with a plurality of remainder thresholds that are multiples of one half of the divisor (i.e., ½ B). As discussed above, the multiples of ½ B may range from 0 to 2.0 B and may even include several thresholds in the negative range (e.g., −0.5 B, −1 B, etc.). By comparing the remainder to the plurality of thresholds, the process may determine which remainder range, bounded by the remainder thresholds, the remainder is in. The process then proceeds to STEP 314.

In STEP 314, the intermediate rounded quotient ($Q_{IR}$) is calculated by looking up the proper rounding action in Table 1 and accordingly modifying the truncated quotient $Q_T$. Table 1 is further described below in reference to FIG. 4. After STEP 314, the process proceeds to STEP 316.

In STEP 316, a rounded remainder ($R_R$) is generated by performing similar calculations as in STEP 310 but using the rounded quotient instead of the truncated quotient. The rounded remainder equals the dividend minus the product of the intermediate rounded quotient times the divisor (i.e., $R_R=A-(Q_{IR} \times B)$). The process then proceeds to STEP 318.

In STEP 318, the inexact flag is generated if the rounded remainder is non-zero (i.e., $R_R \neq 0$). In addition, if the significand of the intermediate rounded quotient contains trailing zeroes, the significand may be right shifted and the exponent may be appropriately increased by the right-shift amount. The resulting quotient may be referred to as the rounded quotient ($Q_R$). The rounded quotient and the inexact flag are outputted and the process terminates. Those skilled in the art will appreciate that the process in FIG. 3 performs STEPS 310, 312, 314, 316, and 318 when the condition in STEP 306 is true (i.e., the exponent is in normal range). In general, most division operations do not result in an exponent going out of range and thus these steps cover the most common scenario in the division operation.

Referring back to STEP 306, instead of proceeding to STEP 310, the execution of the process proceeds to STEP 320 when it is determined that the exponent of Q' is not within the normal range. The algorithm presented in STEP 320 through STEP 342 is used for exponent underflow (i.e., when the preliminary quotient is inexact and the resulting exponent is below qmin, the minimum exponent according to a rule standard). Those skilled in the art will appreciate that steps can be added to account for the case when the exponent overflows (i.e., resulting exponent is larger than qmax, the maximum exponent according to a rule standard). In STEP 320, the exponent of Q' is adjusted (i.e., increased) to the range defined in the standard, referred to as a normal range, and the significand of Q' is shifted to the right the same amount of digits as the exponent is increased. The resulting quotient is referred to as the shifted quotient ($Q_S$). The process then proceeds to STEP 322.

In STEP 322, the shifted quotient is truncated to the required precision level to obtain a shifted truncated quotient ($Q_{ST}$). The estimated dividend is then calculated using $Q_{ST}$. The estimated dividend is the result of the shifted truncated quotient multiplied by the divisor (i.e., $A'=Q_{ST} \times B$). In one or more embodiments of the invention, the estimated dividend is obtained by using the truncated quotient instead of the shifted truncated quotient (i.e., $A'=Q_T \times B$) Also in STEP 322, the process calculates the remainder by subtracting the estimated dividend from the dividend (i.e., $R=A-A'$). In one or more embodiments of the invention, instead of calculating the actual remainder, a flag or a sticky bit may be used to express the sign of the remainder, which may be sufficient for performing a lookup of Tables 2-4. The process then proceeds to STEP 324.

In STEP 324, the intermediate rounded quotient ($Q_{IR}$) is generated by looking up the proper rounding action in Table 2 and modifying $Q_{ST}$ appropriately. Table 2 is further described below in reference to FIG. 5. The process then proceeds to STEP 326.

In STEP 326, it is determined whether a post-correction adjustment is required. The post-correction step is required when the guard digit of the preliminary quotient is GD=9, or when GD=4 and the rounding mode is RNA, or when GD=4, the rounding mode is RNE, and LSB=1. In other words, the post-correction adjustment is required when the following logic function is true: (GD=9) OR (GD=4 AND RNA) OR (GD=4 AND RNE AND LSB=1). When it is determined that a post-correction adjustment is required, the process proceeds to STEP 330. Otherwise, when it is determined that a post-correction adjustment is not required, the process proceeds to STEP 316.

STEP 316 and STEP 318 perform the same operations for the intermediate rounded quotient from STEP 326 as for the intermediate rounded quotient from STEP 314, as described above. Those skilled in the art will appreciate that the process in FIG. 3 performs STEPS 320, 322, 324, 326, 316 and 318 when the condition in STEP 306 is false (i.e., the exponent is not in the normal range) and when the condition in STEP 326 is false (i.e., a post-correction adjustment is not required). In general, most division operations where the exponent underflows follow the sequence of steps described above, except in some cases where a post-correction adjustment is needed. As described above, the process ends after STEP 318 and the rounded quotient and inexact flag are outputted.

In STEP 326, if instead it is determined that the post-correction process is required, the process proceeds to STEP 330. In STEP 330, the guard digit (GD) of Q' is read to determine whether GD=4. When it is determined that GD=4, the process proceeds to STEP 332. Otherwise, when it is determined GD≠4 (i.e., GD=9, as this is the only other option of a post-correction adjustment is required), the process proceeds to STEP 338.

In STEP 332, the value of the intermediate rounded quotient ($Q_{IR}$) is incremented by ½ ULP and the result is aligned (i.e., shifted left to remove leading zeros in the significand) to obtain an aligned intermediate rounded quotient ($Q_{AIR}$). The process then proceeds to STEP 334. In STEP 334, a rounded remainder ($R_R$) is generated by subtracting the product of the aligned intermediate rounded quotient and the divisor from the dividend (i.e., $R_R=A-(Q_{AIR} \times B)$). The process then proceeds to STEP 336.

In STEP 336, a lookup of Table 3 is performed to determine the post-correction adjustment that is to be applied to $Q_{ST}$ based on the $R_R$. After the adjustment is applied to $Q_{ST}$, the resulting quotient is the rounded quotient ($Q_R$). In addition, an inexact flag is generated, and the process terminates. Those skilled in the art will appreciate that STEPS 332, 334, and 336 are performed when the condition in STEP 306 is false (i.e., the exponent is not in the normal range) and when the condition in STEP 326 is true (i.e., a post-correction adjustment is required) and when the condition in STEP 330 is true (i.e., GD=4). Table 3 is further described below in reference to FIG. 6.

Referring back to STEP 330, if the guard digit (GD) does not equal to 4 (i.e., GD=9), the process proceeds to STEP 338. In STEP 338, the value of the intermediate rounded quotient ($Q_{IR}$) is incremented by 1 ULP and the result is aligned (i.e., shifted left to remove leading zeros in the significand) to obtain an aligned intermediate rounded quotient ($Q_{AIR}$). The process then proceeds to STEP 340. In STEP 340, a rounded remainder ($R_R$) is generated by subtracting the product of the intermediate rounded quotient and the divisor from the dividend (i.e., $R_R=A-(Q_{AIR} \times B)$). The process then proceeds to STEP 342.

In STEP 342, a lookup of Table 4 is performed to determine the post-correction adjustment that is to be applied to $Q_{ST}$ based on the $R_R$. After the adjustment is applied to $Q_{ST}$, the resulting quotient is the rounded quotient ($Q_R$). This time, an inexact flag is generated if and only if $R_R \neq 0$. Those skilled in the art will appreciate that STEPS 338, 340, and 342 are performed when the condition in STEP 306 is false (i.e., the exponent is not in the normal range) and when the condition in STEP 326 is true (i.e., a post-correction adjustment is required) and when the condition in STEP 330 is false (i.e., GD≠4, GD=9). Table 4 is further described below in reference to FIG. 7

FIG. 4 shows a table (e.g., a lookup table implemented in hardware or software) that encodes the rounding action used to modify the truncated quotient in STEP 314 of FIG. 3. The leftmost columns of the table specify remainder ranges normalized to the divisor (B) and values of the LSB of the preliminary quotient. The value "X" indicates "don't care", that is the value in the specified cell does not matter as the rounding action does not depend on the actual value in that cell. The top row of the table specifies various rounding modes described above. The contents of the table represent the action to be taken on the truncated quotient. The table entry $Q_T$ refers to no action being taken (i.e., the table indicates that $Q_T$ should be outputted, which is the same as the original truncated quotient, $Q_T$). On the other hand, $Q_T+$, $Q_T++$, and $Q_T+++$ refer to incrementing the truncated quotient by one ULP, two ULPs, and three ULPs, respectively. In some cases, the rounding action also depends on the sign of the truncated quotient. In these cases, the table entry may have two values separated by a slash "/", indicating that in the case the sign is positive, the rounding action to the left of the slash is to be performed, while in the case the sign is negative, the rounding action to the right of the slash is to be performed. For example, consider that the remainder R=½ B, LSB=0, rounding mode RPI, and positive sign. According to the table in FIG. 4, the rounding action chosen would be $Q_{IR}=Q_T+$ (i.e., according to the table entry to the left of the slash in the fourth row from the top of the table and sixth column from the left side of the table). Those skilled in the art will appreciate that in general, as the remainder becomes larger (i.e., the estimated dividend is further away from the dividend), the adjustments to the truncated quotient also become larger.

The table in FIG. 4 may be sufficient if the precision of the preliminary quotient is at least p+1, where p is the required precision by a rule standard, as the remainder is always less than 2.5 B and always greater than or equal to 0. If the preliminary quotient has a precision level p+2 or greater, the remainder is guaranteed to be below 1.5 B, and thus the bottom five rows of the table in FIG. 4 may not needed. On the other hand, the table can be further extended to account for a preliminary quotient of precision p. In this case, however, the remainder may be a high as 11 B and the hardware resources required for implementing such a large lookup table may be too expensive in comparison to extending the precision of the preliminary quotient in the first place.

FIG. 5 shows a table (e.g., a lookup table implemented in hardware or software) that encodes the rounding action used to modify the shifted truncated quotient in STEP 324 of FIG. 3. The leftmost columns of the table specify the values of the LSB of the preliminary quotient, the guard digit (GD) values of the preliminary quotient, and the remainder values. The top row of the table specifies various rounding modes described above. The contents of the table represent the action to be taken on the shifted truncated quotient. The table entry $Q_{ST}$ refers to no action being taken (i.e., the table indicates that $Q_{ST}$ should be outputted, which is the same as the original shifted truncated quotient, $Q_{ST}$). On the other hand, $Q_{ST}+$ refers to incrementing the shifted truncated quotient by one ULP. In addition, the entries of the table that are labeled by an asterisk (*) may require a post-correction adjustment (i.e., the entries with an asterisk satisfy the condition in STEP 326), which is further described in Table 3 and Table 4 in reference to FIG. 6 and FIG. 7, respectively. For example, consider that the remainder R=0, LSB=1, GD=4, and rounding mode RNE. According to the table in FIG. 5, the rounding action chosen would be $Q_{ST}$* (i.e., according to the table entry in the fifth row from the top of the table and fourth column from the left side of the table, the shifted truncated quotient is unmodified but a post-correction is required).

FIG. 6 shows a table (e.g., a lookup table implemented in hardware or software) that encodes the rounding action used to perform a post-correction adjustment in STEP 336 of FIG. 3 when the guard digit is four (i.e., GD=4). The top three rows of Table 3 show table rows in Table 2 in FIG. 2 corresponding to GD=4. The bottom four rows specify the post-correction adjustment that is to be selected for table entries having an asterisks (i.e., indicating that a post-correction adjustment is needed). The rounded remainder, which is different from the remainder in Table 2 as it is calculated using the intermediate rounded quotient, and the LSB values of the preliminary quotient determine what post-correction adjustment needs to be applied. The shaded table entries show cases in which the post-correction adjustment selects a rounded quotient that differ from the intermediate rounded quotient (i.e., the result of the rounding action changes as a result of the post-correction adjustment). For example, for LSB=0 and rounding mode RNE, the post-correction adjustment does not change the intermediate rounded quotient ($Q_{IR}$) selected in STEP 324 of FIG. 3 (i.e., $Q_{IR}=Q_{ST}$ and the corresponding post-correction table entry is also $Q_{ST}$), and accordingly the post-correction table entry is not shaded. However, for the case that the rounded remainder calculated by STEP 334 equals 0, the post-correction adjustment does change the $Q_{IR}$ selected in STEP 324 of FIG. 3 (i.e., $Q_{IR}=Q_{ST}$ and the corresponding post-correction table entry is $Q_{ST}+$, which is one ULP greater than $Q_{IR}$). Accordingly, this post-correction entry is shaded. Those skilled in the art will appreciate that for GD=4, only the intermediate quotients that underwent RNA, RNT, and RNE rounding modes may require a post-correction adjustment. The other rounding modes (i.e., RPI, RMI RTZ, and RAZ) do not require a post-correction adjustment.

FIG. 7 shows a table (e.g., a lookup table implemented in hardware or software) that encodes the rounding action used to perform a post-correction adjustment in STEP 342 of FIG. 3 when the guard digit is nine (i.e., GD=9). The top two rows of Table 4 show the table rows in Table 2 in FIG. 2 corresponding to GD=9. The bottom two rows specify the post-correction adjustment that is to be selected for table entries having an asterisks (i.e., indicating that a post-correction adjustment is needed). The rounded remainder, again determines what post-correction adjustment needs to be applied. In contrast to Table 3, the post-correction adjustment does not depend on the LSB of the preliminary quotient. The shaded table entries show cases in which the post-correction adjustment selects a rounded quotient that is different from the intermediate rounded quotient (i.e., the rounding action changes as a result of the post-correction adjustment). For example, for a rounded remainder <0 and rounding mode RTZ, the post-correction adjustment does not change the intermediate rounded quotient ($Q_{IR}$) selected in STEP 324 of FIG. 3 (i.e., $Q_{IR}=Q_{ST}$ and the corresponding post-correction table entry is also $Q_{ST}$), and accordingly the post-correction table entry is not shaded. However, for the case that the rounded remainder >0, the post-correction adjustment does change the QIR selected in STEP 324 of FIG. 3 (i.e., $Q_{IR}=Q_{ST}$ and the corresponding post-correction table entry is $Q_{ST}+$, which is one ULP greater than $Q_{IR}$). Accordingly, this post-correction entry is shaded. Those skilled in the art will appreciate that for GD=9, the post-correction adjustment may occur for RPI, RMI, RTZ and RAZ rounding modes.

FIG. 8 shows an example of the division process presented in FIG. 3 in accordance with one or more embodiments of the invention. The example shows the rounded quotient ($Q_{IR}$) after executing the process in FIG. 3, where the values that are inputted and derived conform to the IEEE 754-2008 decimal 64 standard. As seen in the example, the divider receives a dividend (A) having significand 8080699100134968, exponent 58, and a negative sign (i.e., $-8080699100134968 \times 10^{58}$), a divisor (B) having significand 9108091862190000, exponent −316, and a positive sign (i.e., $+9108091862190000 \times 10^{-316}$), and RNE rounding mode. As seen in the example, each significand has 16 digits of precision (i.e., p=16). The divider initially computes the reciprocal X=1/B of the divisor and the internal representation within the hardware of X is 1097924807007331.24, having two extra digits of precision for a total of eighteen digits of precision (i.e., p=18). Subsequently, the preliminary quotient (Q') is computed by taking the product of the reciprocal and the dividend to obtain Q'=X×A=8871999999999999.87 and the intermediate exponent is 358. Since the unbiased exponent is in normal range (i.e., qmin=−398<358<369=qmax), no modification to the exponent or shift in the significand is needed. The preliminary quotient is then truncated to obtain the truncated quotient ($Q_T$) which equals $Q_T$=8871999999999999 and has a precision level of p=16. The estimated dividend (A') is then obtained by multiplying the truncated quotient by the divisor: A'=$Q_T$× B=80806991001349670891908137810000. The significand of the estimated divisor is generally stored in double precision (2p), which is 32 digits in this case. The remainder is obtained by first converting the dividend to double precision by adding p or p−1 trailing zeros to the significand and then subtracting the estimated dividend from the dividend to obtain A−A'=910809186219000, which is exactly equal to the divisor B. The division process then performs a lookup of Table 1 using R=B, LSB=1 since the least significant digit of the preliminary quotient is 9 (i.e., it is odd), and rounding mode RNE to obtain the intermediate rounded quotient $Q_{IR}=Q_T+$ =8872000000000000 (i.e., $Q_T$ is incremented by 1 ULP). No post correction is required as the exponent is in normal range. The rounded remainder is calculated using the rounded quotient to obtain $R_R$=A−($Q_R$×B)=0. Since the rounded remainder is zero, the inexact flag is FALSE (i.e., the rounded quotient is exact). In some cases, depending on external or internal control signals, the rounded quotient may be further right shifted to remove some or all trailing zeros, (e.g., the rounded quotient may be $Q_R$=0000000000088720 with exponent 369 instead of $Q_{IR}$=8872000000000000 with exponent 358).

FIG. 9 shows an example of the division process presented in FIG. 3 in accordance with one or more embodiments of the invention. The example shows the rounded quotient ($Q_R$) after executing the process in FIG. 3, where the values used conform to the IEEE 754-2008 decimal 64 standard. As seen in the example, the divider receives a dividend (A) having significand 8080699100134968, exponent −314, and a negative sign (i.e., −8080699100134968×$10^{14}$), a divisor (B) having significand 9108091862190000, exponent 81, and a negative sign (i.e., −9108091862190000×$10^{81}$), and RNE rounding mode. As seen in the example, each significand has 16 digits of precision (i.e., p=16). The divider initially computes the reciprocal X=1/B of the divisor and the internal representation within hardware of X is 1097924807007331.24, having two extra digits of precision for a total of eighteen digits of precision (i.e., p=18). Subsequently, the preliminary quotient (Q') is computed by taking the product of the reciprocal and the dividend to obtain Q'=X× A=8871999999999999.87 and the exponent is −411. This time the exponent is not in normal range (i.e., −411<−398=qmin), so the significand needs to be shifted 13 places to the right to obtain the shifted quotient $Q_S$=0000000000000887.19. The shifted quotient is then truncated to obtain the shifted truncated quotient ($Q_{ST}$) which equals $Q_{ST}$=0000000000000887 and has p=16. The estimated dividend (A') is then obtained by multiplying the shifted truncated quotient by the divisor to obtain A'=$Q_{ST}$× B=8078877481762530000. The remainder is obtained by first converting the dividend to double precision by adding 16−13=3 trailing zeros to the significand and then subtracting the estimated dividend from the dividend to obtain A−A'=1821618372438000, which is greater than zero. Alternatively, $Q_{ST}$ may first be aligned (i.e., left shifted to remove leading zeros) and then the estimated dividend may be calculated by adding p or p−1 digits. Still alternatively, the estimated dividend may be calculated using the truncated quotient (i.e., A'=$Q_T$×B) and the sticky digits, resulting from a right shift, may be used to determine the sign of the remainder. In this example, because the exponent exceeds the normal range, the division process performs a lookup of Table 2 using R>0, LSB=1, GD=1, and rounding mode RNE to obtain the intermediate rounded quotient $Q_R$=$Q_{ST}$=0000000000000887 (i.e., $Q_{ST}$ is not changed). No post correction is required as the GD does not equal four or nine. The rounded remainder is calculated by first aligning $Q_{IR}$ by shifting the significand of $Q_{IR}$ back 13 placed to the left to obtain $Q_{AIR}$ and then calculating $R_R$=A−($Q_{AIR}$×B) =1821618372438000000000000≠0. Since the rounded remainder is not equal to zero, the inexact flag is TRUE (i.e., the rounded quotient is inexact).

FIG. 10 shows an example of the division process presented in FIG. 3 in accordance with one or more embodiments of the invention. The example shows the rounded quotient ($Q_R$) after executing the process in FIG. 3, where the values used conform to the IEEE 754-2008 decimal 64 standard. As seen in the example, the divider receives a dividend (A) having significand 1565793280000000, exponent −86, and a positive sign (i.e., +1565793280000000×$10^{−86}$), a divisor (B) having significand 1024000000000000, exponent 307, and a negative sign (i.e., −1024000000000000×$10^{307}$), and RNE rounding mode. As seen in the example, each significand has 16 digits of precision (i.e., p=16). The divider initially computes the reciprocal X=1/B of the divisor and the internal representation of X is 9765624999999999.94. Those skilled in the art will appreciate that the value of the reciprocal that is calculated is not 9765625000000000.00, which is the exact value, because of the limited precision of hardware (e.g., multiplier, adder, FMA, and other arithmetic blocks) used to calculate the reciprocal of the divisor. Subsequently, the preliminary quotient (Q') is computed by taking the product of the reciprocal and the dividend to obtain Q'=X× A=1529094999999999.99 and the exponent is −408. This time again the exponent is not in normal range (i.e., −408<−398=qmin), so the significand needs to be shifted 10 places to the right to obtain the shifted quotient $Q_S$=0000000000152909.49. The shifted quotient is then truncated to obtain the shifted truncated quotient ($Q_{ST}$) which is $Q_{ST}$=0000000000152909 and has a precision level of p=16. The estimated dividend (A') may be then obtained by multiplying the shifted truncated quotient by the divisor to obtain A'=$Q_{ST}$×B=156578816000000000000. The remainder is obtained by first converting the dividend to double precision by adding 16−10=6 trailing zeros to the significand and subtracting the estimated dividend from the dividend to obtain A−A'=1409214464000000000000, which is greater than zero. Again because the exponent exceeds the normal range, the division process performs a lookup of Table 2 using R>0, LSB=1, GD=4, and rounding mode RNE to obtain the intermediate rounded quotient $Q_{IR}$=$Q_{ST}$=0000000000152909 (i.e., $Q_{ST}$ is not changed) and exponent −398. Because GD=4, the rounding mode is RNE, and the LSB=1, post correction is required this time. Accordingly a rounded estimated dividend is calculated by adding 0.5 ULP to the intermediate rounded quotient, aligning the intermediate rounded quotient by shifting it left 10 places, and multiplying the result by the dividend (i.e., A'=($Q_{IR}$+0.5 ULP)×B=1529095000000000× 1024000000000000=1565793280000000000000000000000). The rounded remainder is calculated using the rounded quotient to obtain $R_R$=A−($Q_{AIR}$×B)=0, where A again is extended to double precision by adding 16 or 15 extra trailing zeros to the significand. The division process performs a lookup of Table 3 with $R_R$=0 and the rounding mode is RNA to determine the post-correction adjustment, which is $Q_R$=$Q_T$+ =0000000000152910 and the exponent is −398. In this case, the post-corrected rounded quotient $Q_R$ differs from the intermediate rounded quotient $Q_{IR}$. Those skilled in the art will appreciate that $Q_R$=0000000000152910 is indeed the correct result given the inputs, and that the result is not correct without performing the post-correction adjustment. Since a post-correction with GD=4 always leads to generating an inexact flag, the inexact flag is TRUE (i.e., the rounded quotient is inexact).

The system(s) and processes described in this detailed description may be used in any application requiring decimal calculations, including (but not limited to) applications of: finance, taxation, investments, transportation, commerce, energy consumption, energy pricing/purchasing, etc.

Figure 11:
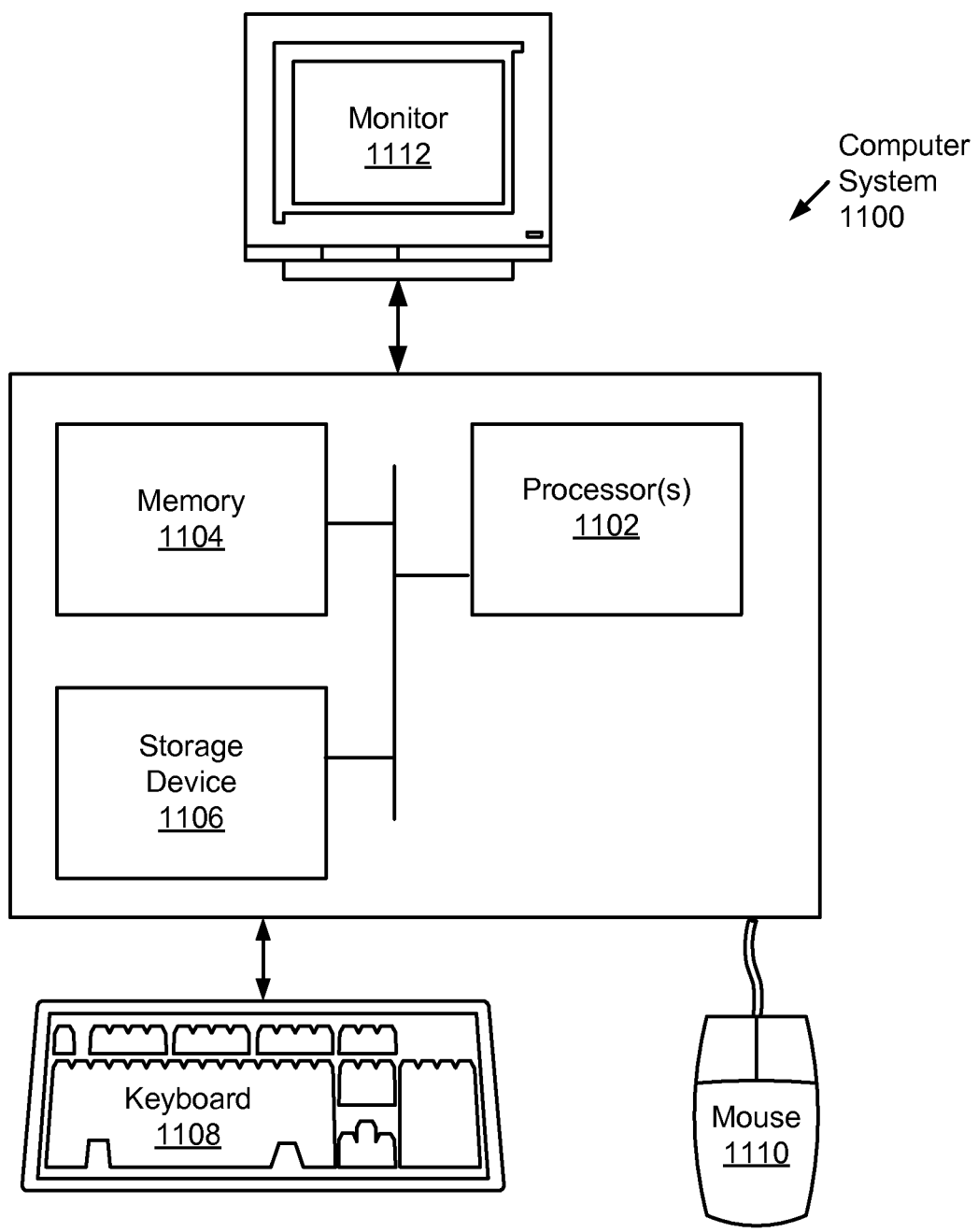
FIG. 11 shows a computer system in accordance with one or more embodiments of the invention.

FIG. 11 shows a computer system (1100) in accordance with one or more embodiments of the invention. One or more portions of the invention may be a component in the computer system (1100) (e.g., an integrated circuit in the computer system (1100)). As shown in FIG. 11, the computer system (1100) includes a processor (1102) such as a hardware processor, integrated circuit, central processing unit, etc., associated memory (1104), a storage device (1106), and numerous other elements and functionalities typical of today's computers (not shown). The computer system (1100) may also include input means, such as a keyboard (1108) and a mouse (1110), and output means, such as a monitor (1112). The computer system (1100) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer system (1100) may be located at a remote location and connected to the other elements over a network. Further, software instructions to perform embodiments of the invention may be stored on a non-transitory computer readable storage medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a decimal floating-point division operation using a decimal floating-point divider circuit, the method comprising:
   receiving, by the decimal floating-point divider circuit, a decimal floating-point dividend and a decimal floating-point divisor;
   obtaining, by the decimal floating-point divider circuit, a preliminary quotient having a first precision level and calculated from the decimal floating-point dividend and the decimal-floating point divisor by:
      obtaining an estimated reciprocal of the decimal floating-point divisor, wherein the estimated reciprocal has a second precision level; and
      obtaining a reciprocal of the decimal floating-point divisor by performing a number of Newton-Raphson iterations on the estimated reciprocal,
      wherein the reciprocal has a third precision level that is greater than or equal to the first precision level, and
      wherein the third precision level depends on the second precision level and the number of Newton-Raphson iterations;
   receiving, by the decimal floating-point divider circuit, a rounding mode;
   selecting a rounding action based on the preliminary quotient and the rounding mode; and
   obtaining a rounded quotient having a fourth precision level by rounding the preliminary quotient according to the rounding action, wherein the first precision level is at least one digit greater than the fourth precision level.

2. The method of claim 1, wherein the Newton-Raphson iterations are performed with a fused-multiply-add (FMA) unit within the decimal floating-point divider circuit.

3. The method of claim 1, wherein the Newton-Raphson iterations are performed with an addition unit and a multiplication unit within the decimal floating-point divider circuit.

4. The method of claim 1, wherein the rounding mode is selected from one of the group consisting of round to nearest ties towards zero, round away from zero, and any rounding modes under the IEEE 754-2008 standard.

5. The method of claim 1, wherein the rounded quotient conforms to the IEEE 754-2008 decimal 64 or decimal 128 standard.

6. The method of claim 1, wherein rounding the preliminary quotient according to the rounding action comprises:
   obtaining a truncated quotient by truncating the preliminary quotient from the first precision level to the fourth precision level; and
   incrementing the truncated quotient by an increment value, wherein the increment value is less than four units in the last place (ULP).

7. The method of claim 6, wherein the preliminary quotient has an exponent in a normal range according to a rule standard, and wherein the method further comprises:
   obtaining an estimated dividend by multiplying the truncated quotient by the decimal floating-point divisor; and
   obtaining a remainder by subtracting the estimated dividend from the decimal floating-point dividend, wherein the rounding action is selected further based on the remainder.

8. The method of claim 7, further comprising:
   obtaining, before selecting the rounding action, a least-significant bit (LSB) of the preliminary quotient, wherein the rounding action is selected further based on the LSB of the preliminary quotient; and
   obtaining, before selecting the rounding action, a sign of the preliminary quotient, wherein the rounding action is selected further based on the sign of the preliminary quotient.

9. The method of claim 7, further comprising:
   obtaining a remainder range by comparing the remainder to a plurality of remainder thresholds, wherein the plurality of remainder thresholds is multiples of one half of the decimal floating-point divisor, and wherein the rounding action is selected further based on the remainder range.

10. The method of claim 7, further comprising:
    obtaining a rounded estimated dividend by multiplying the rounded quotient by the decimal floating-point divisor;
    obtaining a rounded remainder by subtracting the rounded estimated dividend from the decimal floating-point dividend; and
    generating an inexact flag when the rounded remainder does not equal zero.

11. A method for performing a decimal floating-point division operation using a decimal floating-point divider circuit, comprising:
    receiving, by the decimal floating-point divider circuit, a decimal floating-point dividend and a decimal floating-point divisor;
    obtaining, by the decimal floating-point divider circuit, a preliminary quotient having a first precision level,
    wherein the preliminary quotient is calculated from the decimal floating-point dividend and the decimal-floating point divisor, and
    wherein the preliminary quotient has an exponent not in a normal range according to a rule standard;
    receiving, by the decimal floating-point divider circuit, a rounding mode;
    obtaining a shifted quotient by shifting the preliminary quotient to the right to place the exponent in the normal range;
    obtaining a shifted truncated quotient by truncating the shifted quotient to a second precision level, wherein the first precision level is at least one digit greater than the second precision level;
    obtaining an estimated dividend by multiplying the shifted truncated quotient by the decimal floating-point divisor;
    obtaining a remainder by subtracting the estimated dividend from the decimal floating-point dividend;
    selecting a rounding action based on the preliminary quotient, the rounding mode, and the remainder; and obtaining a rounded quotient having the second precision level by rounding the shifted quotient according to the rounding action.

12. The method of claim 11, further comprising:
obtaining a guard digit of the shifted quotient, wherein the rounding action is selected further based on the guard digit;
obtaining an intermediate rounded quotient having the second precision level by rounding the shifted quotient according to the rounding action;
determining, based on the guard digit and the rounding mode, that a post-correction adjustment is required;
selecting the post-correction adjustment based on the guard digit and the rounding mode; and
applying the post-correction adjustment by incrementing the shifted truncated quotient, wherein the rounded quotient is equal to the shifted truncated quotient after the post-correction adjustment is applied.

13. The method of claim 12, wherein the guard digit equals nine, and wherein the post-correction is required in response to the guard digit equaling nine.

14. The method of claim 13, wherein selecting the post-correction adjustment comprises:
obtaining an aligned intermediate rounded quotient by incrementing the intermediate rounded quotient by one ULP;
obtaining an estimated rounded dividend by multiplying the aligned intermediate rounded quotient by the decimal floating-point divisor circuit; and
obtaining a rounded remainder by subtracting the rounded estimated dividend from the decimal floating-point dividend, wherein the post-correction adjustment is selected further based on the rounded remainder.

15. The method of claim 14, wherein an inexact flag is raised when the rounded remainder does not equal zero.

16. The method of claim 12, wherein the guard digit equals four and the rounding mode is RNA, wherein the post-correction adjustment is determined to be required and an inexact flag is raised in response to the guard digit equaling four and the rounding mode being RNA.

17. The method of claim 12, wherein the guard digit equals four, the rounding mode is RNE, and the LSB equals one, wherein the post-correction adjustment is determined to be required and an inexact flag is raised in response to the guard digit equaling four, the rounding mode being RNE, and the LSB equaling one.

18. The method of claim 16, wherein selecting the post-correction adjustment comprises:
obtaining an aligned intermediate rounded quotient by incrementing the intermediate rounded quotient by one half ULP;
obtaining an estimated rounded dividend by multiplying the aligned intermediate rounded quotient by the decimal floating-point divisor; and
obtaining a rounded remainder by subtracting the rounded estimated dividend from the decimal floating-point dividend, wherein the post-correction adjustment is selected further based on the rounded remainder.

19. The method of claim 12, wherein applying the post-correction adjustment comprises changing the intermediate rounded quotient by at most one ULP.

20. A decimal floating-point divider circuit, comprising:
a rounding unit comprising functionality to:
receive a decimal floating-point dividend, a decimal floating-point divisor, and a rounding mode;
receive a preliminary quotient having a first precision level, wherein the preliminary quotient is calculated from the decimal floating-point dividend and the decimal-floating point divisor;
select a rounding action based on the preliminary quotient and the rounding mode; and
obtain a rounded quotient having a second precision level by rounding the preliminary quotient according to the rounding action, wherein the first precision level is at least one digit greater than the second precision level; and
a calculation unit, operatively connected to the rounding unit, and comprising functionality to:
receive the decimal floating-point dividend and the decimal floating-point divisor;
calculate the preliminary quotient from the decimal floating-point dividend and the decimal-floating point divisor by performing a number of Newton-Raphson iterations with a fused-multiply-add (FMA) unit;
obtain a truncated quotient by truncating the preliminary quotient to the second precision level; and
calculate an estimated dividend by multiplying the truncated quotient by the decimal floating-point divisor.

21. The decimal floating-point divider circuit of claim 20, further comprising:
a remainder and sign generation unit configured to obtain a remainder by subtracting the estimated dividend from the decimal floating-point dividend; and
a plurality of comparators configured to obtain a remainder range by comparing the remainder to a plurality of remainder thresholds, wherein the plurality of remainder thresholds is multiples of one half of the decimal floating-point divisor, and wherein the rounding action is selected further based on the remainder range.

22. The decimal floating-point divider circuit of claim 20, further comprising:
a right shifter unit configured to:
obtain the shifted quotient by shifting the preliminary quotient to place an exponent of the preliminary quotient in a normal range according to a rule standard; and
obtain a shifted truncated quotient by truncating the shifted quotient to the second precision level; and
a post-correction unit configured to:
receive a selection of a post-correction adjustment based on a guard digit of the preliminary quotient, the rounding mode, and a rounded remainder; and
apply the post-correction adjustment by incrementing the shifted truncated quotient, wherein the rounded quotient is equal to the shifted truncated quotient after the post-correction adjustment is applied,
wherein the rounding unit further comprises functionality to:
obtain an intermediate rounded quotient having the second precision level by rounding the shifted quotient according to the rounding action;
determine, based on the guard digit and the rounding mode, that the post-correction adjustment is required;
increment the intermediate rounded quotient by an increment value based on the guard digit;
obtain an aligned intermediate rounded quotient by incrementing the intermediate rounded quotient by an increment value, wherein the increment value is based on the guard digit;
obtain an estimated rounded dividend by multiplying the aligned intermediate rounded quotient by the decimal floating-point divisor; and obtain the rounded remainder by subtracting the rounded estimated dividend from the decimal floating-point dividend.

\* \* \* \* \*